United States Patent
Sims (10) Patent No.: US 9,411,648 B2
(45) Date of Patent: Aug. 9, 2016

(54) FLEXIBLE RESOURCE CONFIGURATION MANAGEMENT FOR COMPUTING CLUSTERS

(75) Inventor: Paul Sims, San Antonio, TX (US)

(73) Assignee: Rackspace US, Inc., San Antonio, TX (US)

( * ) Notice: Subject to any disclaimer, the term of this patent is extended or adjusted under 35 U.S.C. 154(b) by 915 days.

(21) Appl. No.: 13/536,619

(22) Filed: Jun. 28, 2012

(65) Prior Publication Data

US 2014/0006621 A1 Jan. 2, 2014

(51) Int. Cl.
*G06F 15/173* (2006.01)
*G06F 9/50* (2006.01)
*H04L 5/00* (2006.01)
*H04L 12/46* (2006.01)

(52) U.S. Cl.
CPC ............... *G06F 9/5011* (2013.01); *G06F 9/50* (2013.01); *G06F 9/5016* (2013.01); *H04L 5/0035* (2013.01); *H04L 12/4641* (2013.01); *G06F 2209/5011* (2013.01)

(58) Field of Classification Search
CPC .............................. G06F 15/173; G06F 15/16
See application file for complete search history.

(56) References Cited

U.S. PATENT DOCUMENTS

| | | | | |
|---|---|---|---|---|
| 8,898,402 | B1 * | 11/2014 | Stronge | 711/154 |
| 2004/0267897 | A1 * | 12/2004 | Hill | G06F 9/505 709/217 |
| 2005/0240928 | A1 * | 10/2005 | Brown et al. | 718/100 |
| 2010/0020806 | A1 | 1/2010 | Vahdat et al. | |
| 2011/0213886 | A1 * | 9/2011 | Kelkar | G06F 9/5072 709/226 |

OTHER PUBLICATIONS

U.S. Appl. No. 13/352,852, entitled "Optimizing Allocation of On-Demand Resources Using Performance Zones," filed Jan. 18, 2012, by Eric V. Carlin, et al.
U.S. Appl. No. 13/036,219, entitled "Automated Hybrid Connections Between Multiple Environments in a Data Center," filed Feb. 28, 2011, by Christopher Kuehl.

* cited by examiner

*Primary Examiner* — Aftab N Khan
(74) *Attorney, Agent, or Firm* — Trop, Pruner & Hu, P.C.

(57) ABSTRACT

In an embodiment, a method includes maintaining a pool of server resources, maintaining a pool of storage resources, maintaining a pool of network resources, and initializing, via a meta-cluster software manager, a multi-function cluster associated with a first customer of a datacenter including the pools. This multi-function cluster may include first servers of the pool of server resources, first storage devices of the pool of storage resources, and first network devices of the pool of network resources, and may be managed by the meta-cluster manager.

16 Claims, 5 Drawing Sheets

FLEXIBLE RESOURCE CONFIGURATION MANAGEMENT FOR COMPUTING CLUSTERS

BACKGROUND

In today's datacenter environments, many different types of resources are present, from switches and routing devices that couple incoming communication traffic from the Internet to load balancers or other equipment that in turn couples the traffic to a destination resource such as a server. In turn the servers can further be connected to other datacenter equipment, such as data storage equipment.

In a multi-tenant datacenter, various resources can be dedicated to a particular customer of the datacenter. Other computing models provide for so-called cloud resources that are flexibly allocated to datacenter customers, e.g., depending on customer needs. In general when equipment is allocated to a customer, it is first required to be installed into a datacenter location such as a rack-based cabinet. Then, various connections can be made to the resource. After these operations the underlying resource, e.g., a server, is then allocated to the given customer.

Oftentimes, a customer will have various clusters including compute clusters which include multiple servers or other computing devices, storage clusters which can include storage devices, load balancer clusters and so forth. Each of these clusters is dedicated to a particular type of resource and is controlled by cluster management software that is focused solely on this single function without consideration to any entity external to this function.

While a customer obtains the desired resources, there is much manual intervention to allocate the resources to the customer. In addition, it is difficult to reallocate resources to different customers. Furthermore, given the single function nature of clusters, certain difficulties arise between resources of different cluster types.

SUMMARY OF THE INVENTION

According to one aspect, a system includes a pool of server resources including a plurality of servers, at least some of the servers coupled to a datacenter management system but not allocated to a customer of the datacenter. The system further includes a pool of storage resources including a plurality of storage devices, at least some of the storage devices coupled to the datacenter management system but not allocated to a customer of the datacenter. The system further includes a pool of network resources including a plurality of network devices, at least some of the network devices coupled to the datacenter management system but not allocated to a customer of the datacenter.

The system may further include a meta-cluster software manager to initialize a multi-function cluster associated with a first customer of the datacenter, where this cluster includes first servers of the pool of server resources, first storage devices of the pool of storage resources, and first network devices of the pool of network resources. The multi-function cluster software manager may further manage the multi-function cluster. As examples, the cluster management includes de-allocation of at least one of the first servers, e.g., responsive to a reclamation request, and further includes re-allocation of a first server to a second multi-function cluster associated with a second customer of the datacenter.

In an embodiment, the initialization of the multi-function cluster includes assigning at least one resource from each of the pool of server resources, the pool of storage resources, and the pool of network resources to the multi-function cluster. In addition, one or more virtual local area networks (VLANs) can be assigned to the assigned resources, along with networks. Then at least some of the resources can be configured, have deployment tasks run on them, to verify a configuration of the multi-function cluster.

The multi-cluster software manager may include, in an embodiment, an input logic to receive requests from a first customer of the datacenter for management of the multi-function cluster; a query logic to query a state of the multi-function cluster; a reclamation logic to reclaim resources from the multi-function cluster; a provisioning logic to provision resources to the multi-function cluster from the various pools; and a control engine to configure resources into the multi-function cluster.

Another aspect is directed to a method for maintaining a pool of server resources, maintaining a pool of storage resources, maintaining a pool of network resources, and initializing, via a meta-cluster software manager, a multi-function cluster associated with a first customer of the datacenter. This multi-function cluster may include first servers of the pool of server resources, first storage devices of the pool of storage resources, and first network devices of the pool of network resources, and may be managed by the meta-cluster manager. In an embodiment, a computer-readable storage medium may be configured to perform the method using logic of a system.

DETAILED DESCRIPTION

In various embodiments, resources of many different types can be allocated into a single cluster that provides for functionality and common control of these various resources. To this end, embodiments may further provide so-called meta-cluster control software such as an orchestration layer that can dynamically and flexibly allocate, de-allocate, and re-allocate resources to different clusters, including clusters of different customers of a datacenter, e.g., based on demand.

Furthermore, embodiments provide for enhanced and flexible handling of datacenter equipment, in that unallocated resources, also referred to herein as blank resources, can be installed and wired into datacenter locations prior to their allocation to any particular customer. Then, under control of the meta-cluster software these resources can be dynamically allocated to given customers, without any need for manual intervention by way of installing the resources, wiring the resources, configuring the resources or so forth.

Accordingly, various equipment can be maintained in a pre-allocation state. For example, server cabinets, load balancer cabinets, storage cabinets, cabinets including multiple resources, among other datacenter enclosures can be configured ahead of time. That is, these various physical resources can be plugged in, interconnected via cabling and so forth such that the resources are available to be allocated on demand by the meta-cluster software. Note that while described with dedicated cabinets for different kinds of resources, e.g., server, storage, load balancer and so forth, understand that other cabinets or datacenter enclosures each may house physical resources of different types including computing, switching, storage and so forth.

The meta-cluster software may further control power management, network management, server configurations and integrating additional physical resources into a given multi-function cluster in accordance with an embodiment of the present invention. Meta-cluster software in accordance with an embodiment of the present invention may further police the different clusters to determine when resources are not being adequately used and in such cases, to flexibly de-allocate the resources from a given cluster and possibly re-allocate them to a different cluster.

Figure 1:
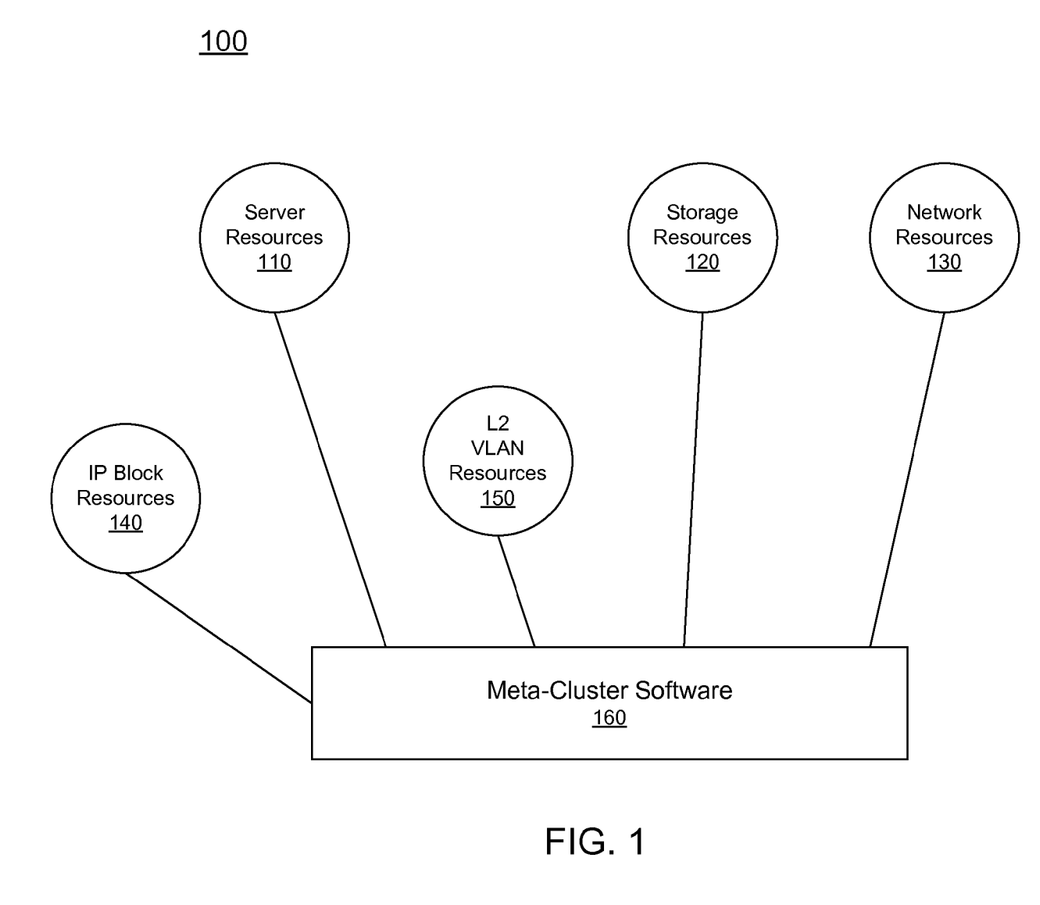
FIG. 1 is a block diagram of an overall architecture of a datacenter having a multi-function cluster arrangement in accordance with an embodiment of the present invention.

Referring now to FIG. 1, shown is a block diagram of an overall architecture of a datacenter having a multi-function cluster arrangement in accordance with an embodiment of the present invention. As shown in FIG. 1, a datacenter 100 includes various pools of resources. Specifically shown are individual physical resource pools including a server resource pool 110, a storage resource pool 120, and a network resource pool 130. Note that these pools can be either virtual or physical pools or a combination thereof. In addition, an Internet protocol (IP) block resource pool 140 and a layer 2 (L2) virtual local area network (VLAN) resource pool 150 are present. As seen, all of these individual resource pools may couple with a meta-cluster software 160 in accordance with an embodiment of the present invention. This meta-cluster software may control provisioning of resources within these various pools, including de-allocation and re-allocation.

With further reference to FIG. 1, server resources 110 can include multiple individual servers, e.g., as configured into cabinets. As is well known, each such server can include one or more processors, memory, a network device, mass storage, and other components. As an example, a datacenter can include many individual clusters, each of which can include a plurality of servers. As one example, a cabinet can include approximately 30 individual servers, each of which can be configured as a rack-mounted server installed as into the cabinet via a chassis or other mechanism. As described above, these individual servers can be initially provided in a blank or unallocated state such that cabinets can be brought into pool 110 in an unallocated state. That is, although the cabinet may include multiple servers, all of which are fully wired and configured, they are not allocated to a given customer until assigned by meta-cluster software 160.

Similarly, storage resource pool 120 can include various types of storage resources including, for example, storage attached networks (SANs), fibre channel-based storage, SCSI-based storage, among many others. As is well known, these storage resources can be of various types, including magnetic, optical or other types of storage medium. As with the server resources, these storage resources can be provided in cabinets or other enclosures into storage pool 110 in a fully connected and configured state. However, they are not allocated to a given customer until assigned by meta-cluster software 160.

Similarly, network resource pool 130 can include various types of physical network equipment including firewalls, switches, intrusion detection systems (IDSs), routers, load balancers, L2+network extension devices, virtual private network (VPN) accelerators and so forth. As above, these various physical resources can be connected into a cabinet or other enclosure and provided to pool 130 prior to their allocation to a given customer.

As to IP block resource pool 140 and L2 VLAN resource pool 150, these resources, which correspond to identifiers to provide interconnection between certain resources and a given customer, can similarly be incorporated into the given pools in an unallocated state unit allocated to a given customer having meta-cluster software 160.

Finally with regard to FIG. 1, meta-cluster software 160 may be a high level orchestration layer that provides for an overall view of a multi-function cluster in accordance with an embodiment of the present invention. This meta-cluster software can perform various operations to control a given cluster with which it is associated. In this way, this software can control all allocation, de-allocation and reallocation decisions on behalf of diverse resources within a single multi-function cluster. Note that multiple instances of this meta-cluster software can be provided, one instance for each group (where a group can be one or more clusters). As an example, each datacenter customer that seeks to take advantage of a multi-function cluster in accordance with an embodiment of the present invention can have a single instance of the meta-cluster software associated with multiple clusters of one or more customers. Although shown at this high level in the embodiment of FIG. 1, understand the scope of the present invention is not limited in this regard.

Figure 2:
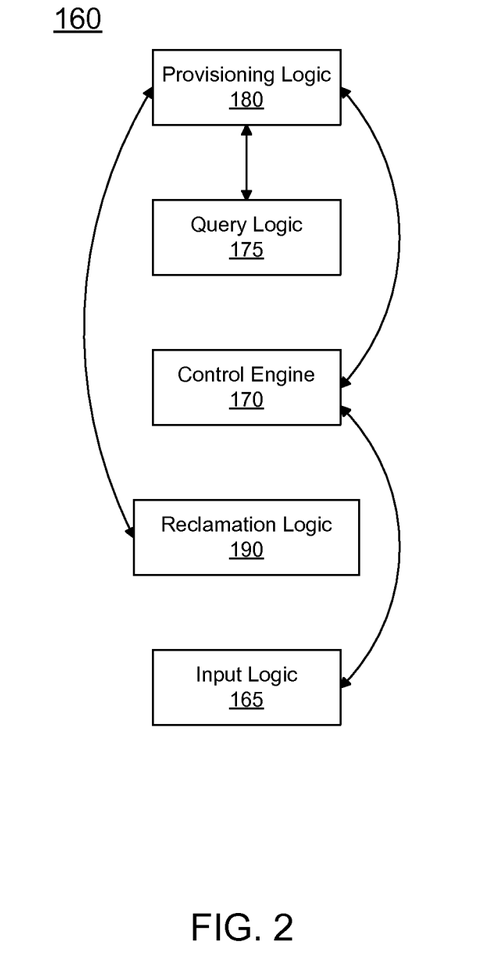
FIG. 2 is a block diagram of various components within a meta-cluster software arrangement in accordance with an embodiment of the present invention.

Referring now to FIG. 2, shown is a block diagram of various components within a meta-cluster software arrangement in accordance with an embodiment of the present invention. As shown in FIG. 2, meta-cluster software 160 may include various modules, engines, logic and so forth. In different implementations, these components can be incorporated in code that is stored in a non-transitory storage medium such as a non-volatile storage, mass storage, memory or so forth. This code can accordingly be executed, e.g., on a general-purpose or other processor that can execute the instructions of the code. Other components may be incorporated into hardware and/or firmware.

As shown in FIG. 2, software 160 may include an input logic 165 that can be used to receive incoming requests, e.g., for provisioning of a multi-function cluster, allocation of additional resources to such cluster, deallocation of resources or so forth. In general, input logic 165 may process the incoming requests and provide them to a control engine 170 which may control the overall operations of the meta-cluster software. As seen, control engine 170 may be in communication with a query logic 175 which may receive requests from control engine 170 and generate queries to provide to a provisioning logic 180.

In various embodiments, provisioning logic 180 may make provisioning decisions based on the incoming queries and a knowledge of the availability of resources, both already allocated to a given cluster, as well as available datacenter resources that can be allocated into the cluster. Accordingly, provisioning logic 180 may be in communication with inventory tracking tools and/or databases that provide information as to the availability of resources, including compute, memory, storage, and network resources.

In turn, provisioning logic 180 may be in communication with a reclamation logic 190 which may be used to determine the availability of resources for reclamation, e.g., when they are not being sufficiently used by a given cluster. Based on these reclamation operations, provisioning logic 180 can identify the resources to be allocated and provide the information to control engine 170 that in turn can configure the resources for incorporation into a given cluster. Although shown at this high level in the embodiment of FIG. 2, understand the scope of the present invention is not limited in this regard.

Figure 3:
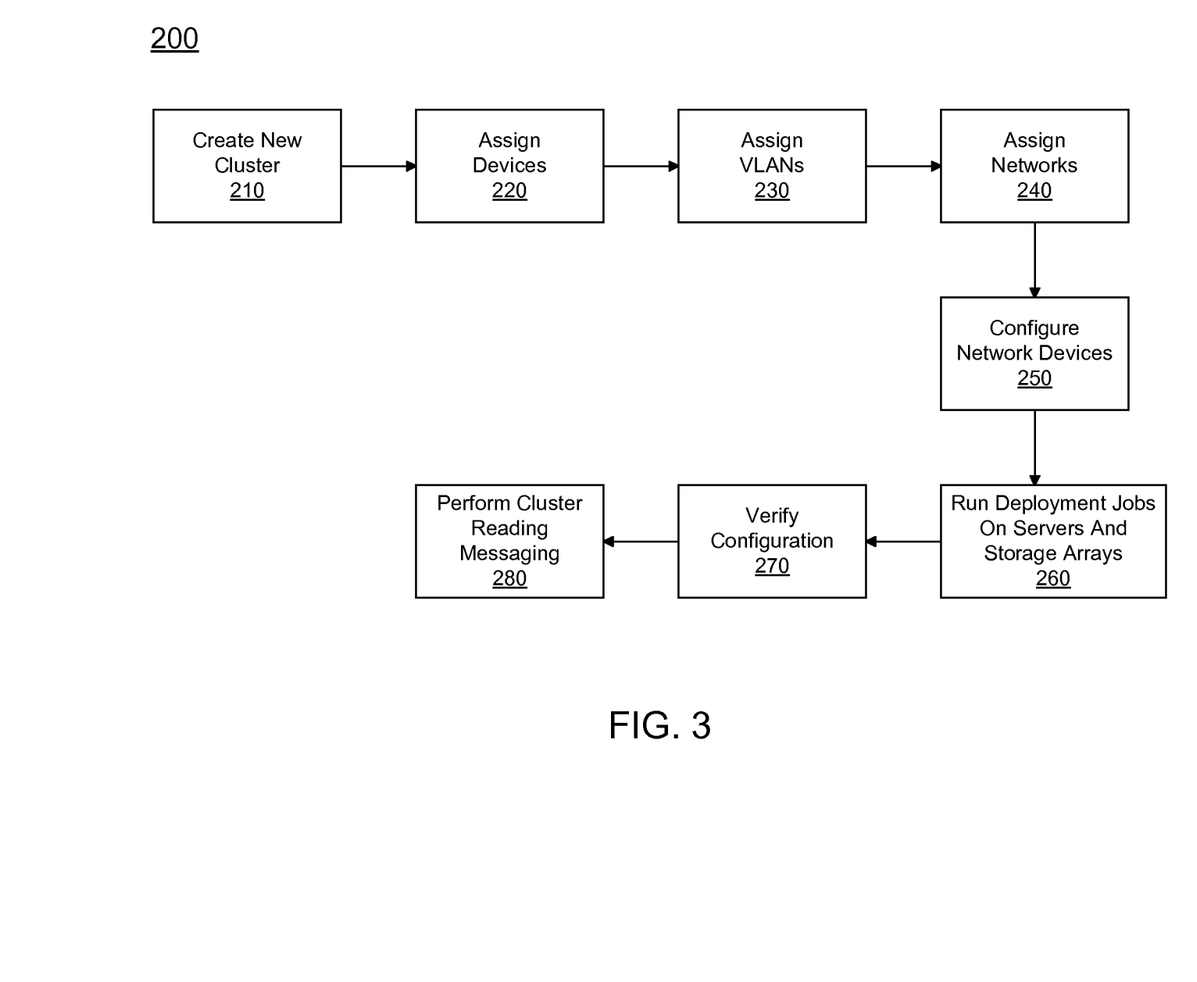
FIG. 3 is a flow diagram of a process for creating a new multi-function cluster in accordance with an embodiment of the present invention.

Referring now to FIG. 3, shown is a flow diagram of a process for creating a new multi-function cluster in accordance with an embodiment of the present invention. In various embodiments, method 200 can be executed by an instance of the meta-cluster software. As shown in FIG. 3, method 200 can begin by creating a new cluster (block 210). For example, a new cluster can be created upon a request of a customer for a multi-function cluster. To this end, a meta-cluster software instantiation can be allocated to the customer. The information to create cluster may include, in an embodiment, a customer identifier, cluster type, capacity demanded, and durability requirements. Then, at block 220 devices may be assigned to the cluster. As an example, a customer may desire physical resources to be allocated together in a single cluster. For purposes of discussion assume that these physical resources include disparate resources, such as at least computing resources, storage resources and network resources. Various operations may be performed in assigning the devices.

Still referring to FIG. 3, next control passes to block 230 where VLANs can be assigned. In various embodiments, each of these VLANs can be associated with the blank resources assigned to the cluster. Each resource may be provided with at least 1 VLAN, and more typically, a plurality of VLANs. Next, networks, including firewalls, switches or so forth and Layer 3 networks routed on them can be assigned (block 240), and then configuration of the network devices may be performed (block 250). As an example, network device configuration can include insertion of various configuration information.

Still referring to FIG. 3, deployment jobs can be run on the servers and storage arrays, e.g., to test operation of the devices (block 260). From this, a configuration of the multi-function cluster can be verified (block 270). Finally, assuming that the configuration is verified control passes to block 280 where a cluster ready message may be sent, e.g., to the customer. Thus in this way, the customer is advised of the availability of the requested cluster. Note that although shown at this high level in the embodiment of FIG. 3, the scope of the present invention is not limited in this regard.

Figure 4:
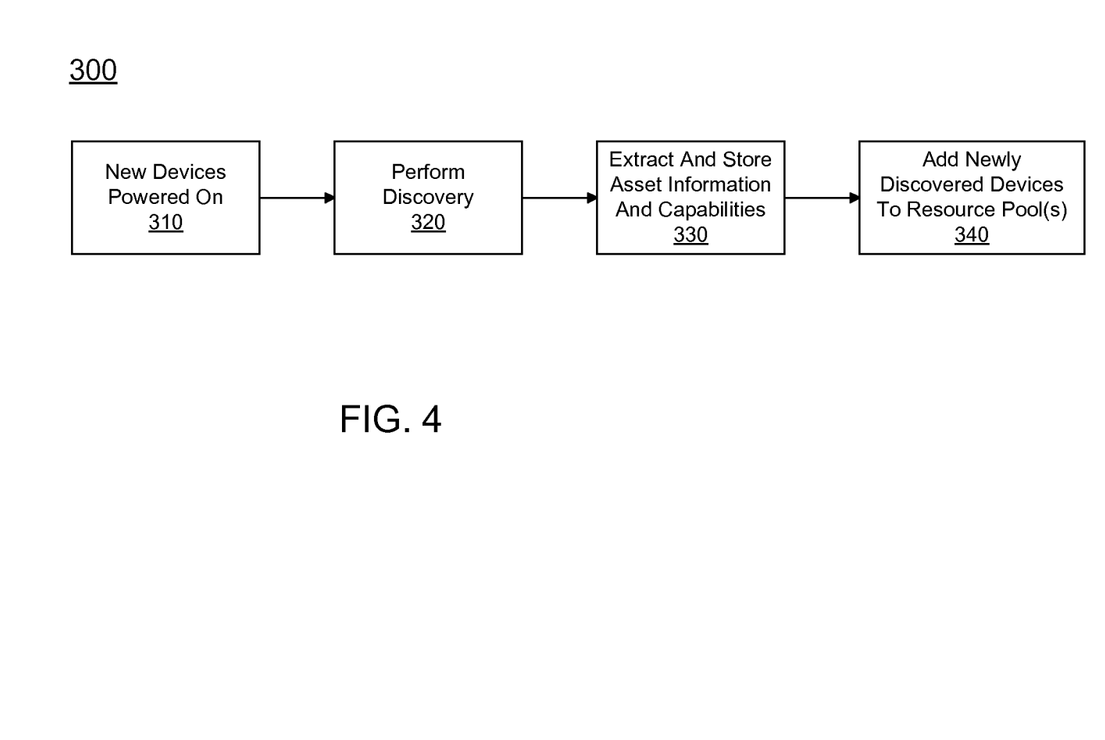
FIG. 4 is a flow diagram of additional operations performed by meta-cluster software in accordance with an embodiment of the present invention.

Referring now to FIG. 4, shown is a flow diagram of additional operations performed by meta-clustering software in accordance with an embodiment of the present invention. Specifically as shown in FIG. 4, method 300 may be executed by meta-cluster software to add resources to a pool. As shown, method 300 may begin by powering on the devices (block 310). Note that this powering on of new devices may be for devices added to a pool of resources. For example, a roll on rack of blank resources can be installed into a datacenter and connected in so that a communication channel with the meta-cluster software can be established. Accordingly, control passes to block 320 where discovery of the devices can occur, e.g., by a discovery agent, which may be part of the meta-cluster software. Next, control passes to block 330 where asset information and capabilities of the devices can be extracted and stored. In one embodiment, this information may be stored in an asset database. Accordingly, control next passes to block 340 where these newly added devices can be added to a pool of available resources of the given type.

Figure 5:
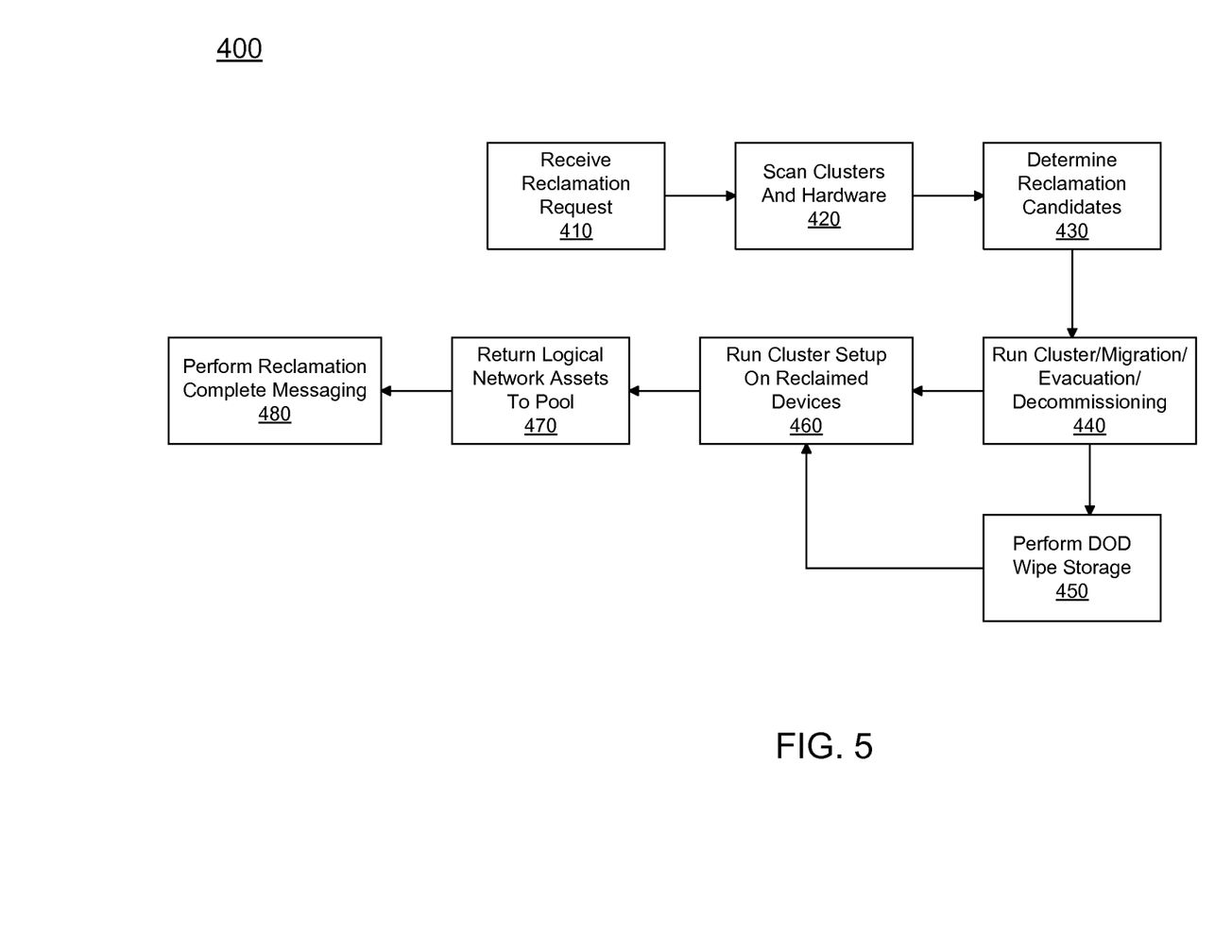
FIG. 5 is a flow diagram of a reclamation process in accordance with an embodiment of the present invention.

Referring now to FIG. 5, shown is a flow diagram of a reclamation process in accordance with an embodiment of the present invention. As shown in FIG. 5, method 400 may begin by receiving a reclamation request (block 410). In various embodiments, this reclamation request can be received from various locations, e.g., manually from a given user such as a customer that wants to reclaim resources, e.g., to avoid paying for unneeded resources or for another such reason. As another example, the request may be a cluster request, e.g., initiated by a meta-cluster software itself. Or the request may occur as a result of a low pool threshold. As one example, meeting of this low pool threshold may occur when a given cluster has less than a predetermined level of available resources for allocation.

As seen, control passes to block 420 where one or more clusters and their underlying hardware can be scanned to determine physical resources available for reassignment. In an embodiment scanning is done through the discovery agent, based on resource utilization the meta-cluster software will elect to reap the compute from one cluster and reformat it to another cluster. Note that a single meta-cluster software instance can scan many clusters, regardless of type. Next at block 430 based on this scan of available resources, reclamation conditions can be determined, and from these conditions a reclamation determination may be made. In various embodiments, this determination can be based on availability of resources, identification of jobs/customers running on the devices or so forth.

Still referring to FIG. 5, control next passes to block 440 where the various operations in connection with reclamation can occur. In the embodiment shown, these operations can include performing cluster migration and/or evacuation, along with decommissioning particular resources. For certain resources such as storage resources, control can pass to block 450 where a DOD wipe process can be performed to ensure that any data cannot be recovered.

As seen, control next passes to block 460 where a cluster set up can be run on the newly decommissioned devices. This setup may include installation of base operating system, user configuration, software installation, cluster software installation, and startup operations. Next, control passes to block 470 where logical network assets can be returned to their respective pools. Although the scope of the present invention is not limited in this regard, these logical network assets may include IP addresses, L2 VLANs and so forth. Finally, control passes to block 480 where a completion of reclamation message may be sent to a destination. For example, in one embodiment the customer requesting a reclamation can be advised when that reclamation has completed. Although shown at this high level in the embodiment of FIG. 5, understand the scope of the present invention is not limited in this regard.

Embodiments may be implemented in code and may be stored on a storage medium having stored thereon instructions which can be used to program a system to perform the instructions. The storage medium may include, but is not limited to, any type of non-transitory storage medium suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:
1. A system comprising:
   a pool of hardware server resources including a plurality of hardware servers, at least some of the plurality of hardware servers coupled to a datacenter management system but not allocated to a customer of the datacenter;

a pool of hardware storage resources including a plurality of hardware storage devices, at least some of the plurality of hardware storage devices coupled to the datacenter management system but not allocated to a customer of the datacenter;

a pool of physical network resources including a plurality of physical network devices, at least some of the plurality of physical network devices coupled to the datacenter management system but not allocated to a customer of the datacenter; and a meta-cluster software manager to initialize a multi-function cluster associated with a first customer of the datacenter, the multi-function cluster including first hardware servers of the pool of hardware server resources, first hardware storage devices of the pool of hardware storage resources, and first physical network devices of the pool of physical network resources, the meta-cluster software manager further to manage the multi-function cluster, wherein the meta-cluster software manager is to identify additional hardware servers for incorporation into the pool of hardware server resources responsive to installation and powering of the additional hardware servers into an enclosure of the datacenter as a roll on rack of blank hardware resources and to maintain the additional hardware servers in a pre-allocation state, including discovering the additional hardware servers by a discovery agent of the meta-cluster software manager, extracting and storing asset information from the additional servers in an asset database to be accessed by a provisioning logic of the meta-cluster software manager, and including the additional hardware servers in the pool of available hardware server resources, and thereafter to dynamically allocate at least some of the additional hardware servers to the first customer, wherein the meta-cluster software manager includes:

an input logic to receive requests from the first customer of the datacenter for management of the multi-function cluster;

a query logic to query a state of the multi-function cluster;

a reclamation logic to reclaim resources from the multi-function cluster; and the provisioning logic to provision resources to the multi-function cluster from the pool of hardware server resources, the pool of hardware storage resources, and the pool of physical network resources.

2. The system of claim 1, wherein the multi-function cluster management includes de-allocation of at least one of the first hardware servers.

3. The system of claim 2, wherein the multi-function cluster management is to de-allocate the at least one first hardware server responsive to a reclamation request.

4. The system of claim 3, wherein the multi-function cluster management is to re-allocate the at least one first hardware server to a second multi-function cluster associated with a second customer of the datacenter.

5. The system of claim 3, wherein the de-allocation includes:

scanning one or more multi-function clusters to determine physical resources available for reassignment, determining reclamation candidates from the one or more multi-function clusters, selecting at least one resource from the reclamation candidates for the de-allocation, performing a cluster migration with regard to the at least one resource, and decommissioning the at least one resource.

6. The system of claim 5, wherein the de-allocation includes:

performing a cluster set up on the at least one resource.

7. The system of claim 1, wherein the initialization of the multi-function cluster includes:

assigning at least one resource from each of the pool of hardware server resources, the pool of hardware storage resources, and the pool of physical network resources to the multi-function cluster, assigning virtual local area networks (VLANs) to the assigned resources, assigning networks, performing configuration of the resources, running deployment tasks on the hardware server resources and the hardware storage resources, and verifying a configuration of the multi-function cluster.

8. The system of claim 1, wherein the meta-cluster software manager further includes: a control engine to configure resources into the multi-function cluster.

9. A method comprising:

maintaining a pool of server resources including a plurality of servers, at least some of the plurality of servers coupled to a datacenter management system but not allocated to a customer of the datacenter;

maintaining a pool of storage resources including a plurality of storage devices, at least some of the plurality of storage devices coupled to the datacenter management system but not allocated to a customer of the datacenter;

maintaining a pool of network resources including a plurality of network devices, at least some of the plurality of network devices coupled to the datacenter management system but not allocated to a customer of the datacenter;

initializing, via a meta-cluster software manager, a multi-function cluster associated with a first customer of the datacenter, the multi-function cluster including first servers of the pool of server resources, first storage devices of the pool of storage resources, and first network devices of the pool of network resources; and identifying, via the meta-cluster software manager, additional servers for incorporation into the pool of server resources responsive to installation and powering of the additional servers into an enclosure of the datacenter as a roll on rack of blank hardware resources and maintaining the additional servers in a pre-allocation state, including discovering the additional servers, extracting and storing asset information from the additional servers in an asset database, and including the additional servers in the pool of available server resources, and thereafter dynamically allocating at least some of the additional servers to the first customer, wherein the meta-cluster software manager includes:

an input logic to receive requests from the first customer of the datacenter for management of the multi-function cluster;

a query logic to query a state of the multi-function cluster;

a reclamation logic to reclaim resources from the multi-function cluster; and the provisioning logic to provision resources to the multi-function cluster from the pool of server resources, the pool of storage resources, and the pool of network resources.

10. The method of claim 9, further comprising managing the multi-function cluster via the meta-cluster software manager.

11. The method of claim 9, further comprising:

de-allocating at least one of the first servers responsive to a reclamation request; and re-allocating the at least one first server to a second multi-function cluster associated with a second customer of the datacenter.

12. The method of claim 9, wherein initializing the multi-function cluster includes assigning at least one resource from each of the pool of server resources, the pool of storage resources, and the pool of network resources to the multi-function cluster, assigning virtual local area networks (VLANs) to the assigned resources, assigning networks, performing configuration of the resources, running deployment tasks on the server resources and the storage resources, and verifying a configuration of the multi-function cluster.

13. The method of claim 9, further comprising scanning one or more multi-function clusters to determine physical resources available for reassignment, determining reclamation candidates from the one or more multi-function clusters, selecting at least one resource from the reclamation candidates for the de-allocation, performing a cluster migration with regard to the at least one resource, and decommissioning the at least one resource.

14. An article comprising a non-transitory computer-readable storage medium comprising instructions to:
   maintain a pool of server resources including a plurality of servers, at least some of the plurality of servers coupled to a datacenter management system but not allocated to a customer of the datacenter;
   maintain a pool of storage resources including a plurality of storage devices, at least some of the plurality of storage devices coupled to the datacenter management system but not allocated to a customer of the datacenter;
   maintain a pool of network resources including a plurality of network devices, at least some of the plurality of network devices coupled to the datacenter management system but not allocated to a customer of the datacenter; and
   initialize, via a meta-cluster software manager, a multi-function cluster associated with a first customer of the datacenter, the multi-function cluster including first servers of the pool of server resources, first storage devices of the pool of storage resources, and first network devices of the pool of network resources, wherein the meta-cluster software manager is to identify additional servers for incorporation into the pool of server resources responsive to installation and powering of the additional servers into an enclosure of the datacenter as a roll on rack of blank resources and to maintain the additional servers in a pre-allocation state, including discovering the additional servers by a discovery agent of the meta-cluster software manager, extracting and storing asset information from the additional servers in an asset database to be accessed by a provisioning logic of the meta-cluster software manager, and including the additional servers in the pool of server resources, and thereafter to dynamically allocate at least some of the additional servers to the first customer, wherein the meta-cluster software manager includes:
   an input logic to receive requests from the first customer of the datacenter for management of the multi-function cluster;
   a query logic to query a state of the multi-function cluster;
   a reclamation logic to reclaim resources from the multi-function cluster; and
   the provisioning logic to provision resources to the multi-function cluster from the pool of server resources, the pool of storage resources, and the pool of network resources.

15. The article of claim 14, further comprising instructions to manage the multi-function cluster via the meta-cluster software manager.

16. The article of claim 14, further comprising instructions to scan one or more multi-function clusters to determine physical resources available for reassignment, determine reclamation candidates from the one or more multi-function clusters, select at least one resource from the reclamation candidates for the de-allocation, perform a cluster migration with regard to the at least one resource, and decommission the at least one resource.

* * * * *